Aug. 30, 1938.   J. J. GUEST   2,128,815
GEARING
Filed Jan. 16, 1936   2 Sheets-Sheet 1
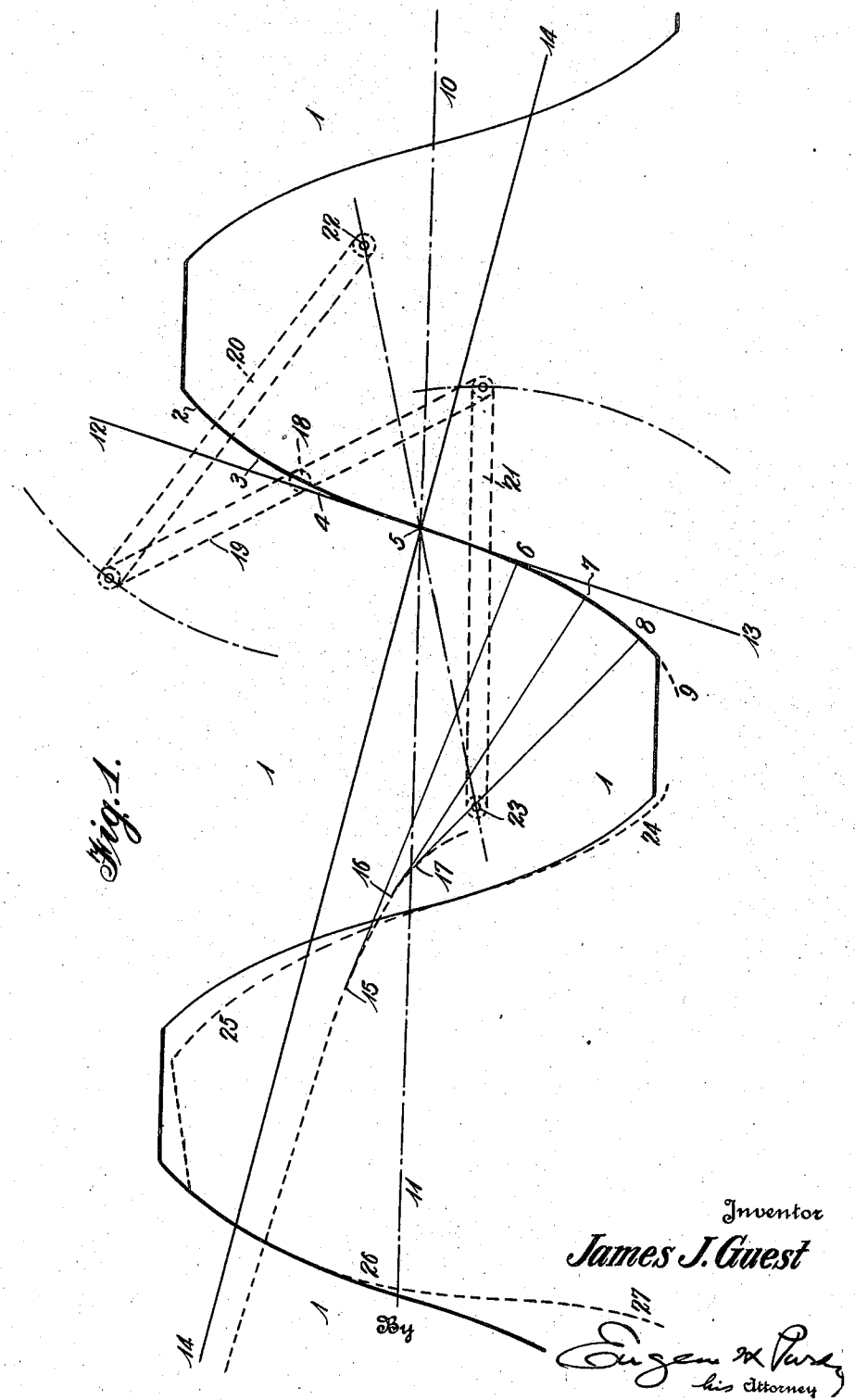
Inventor
James J. Guest Aug. 30, 1938.    J. J. GUEST    2,128,815
GEARING
Filed Jan. 16, 1936    2 Sheets-Sheet 2
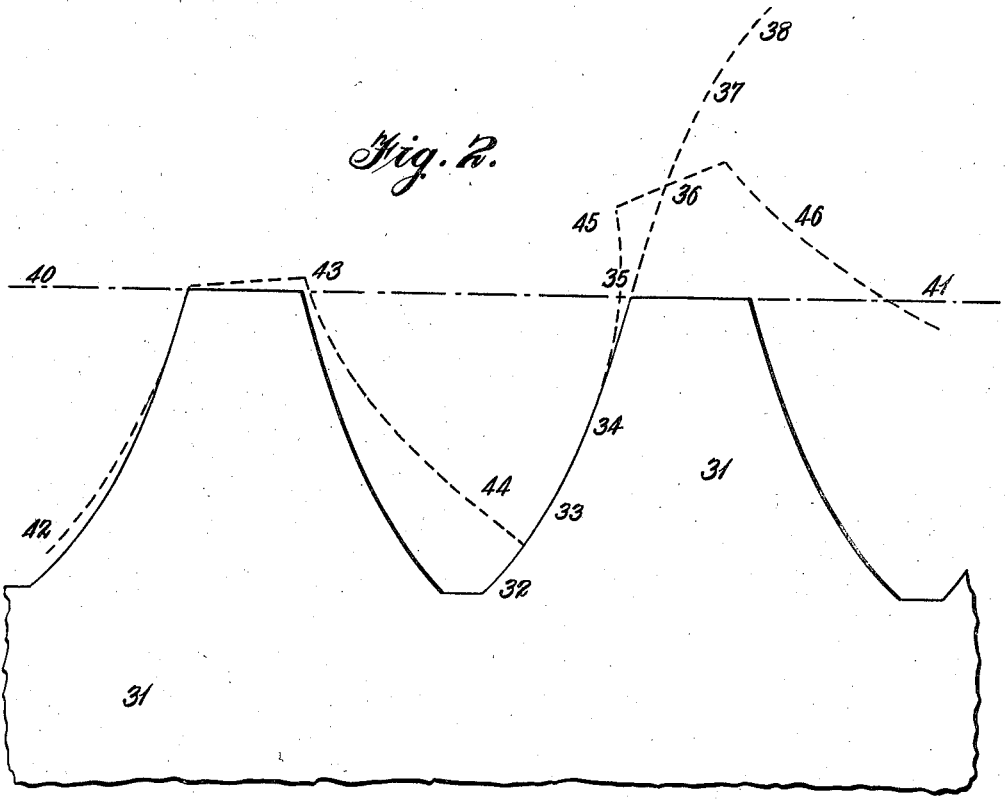
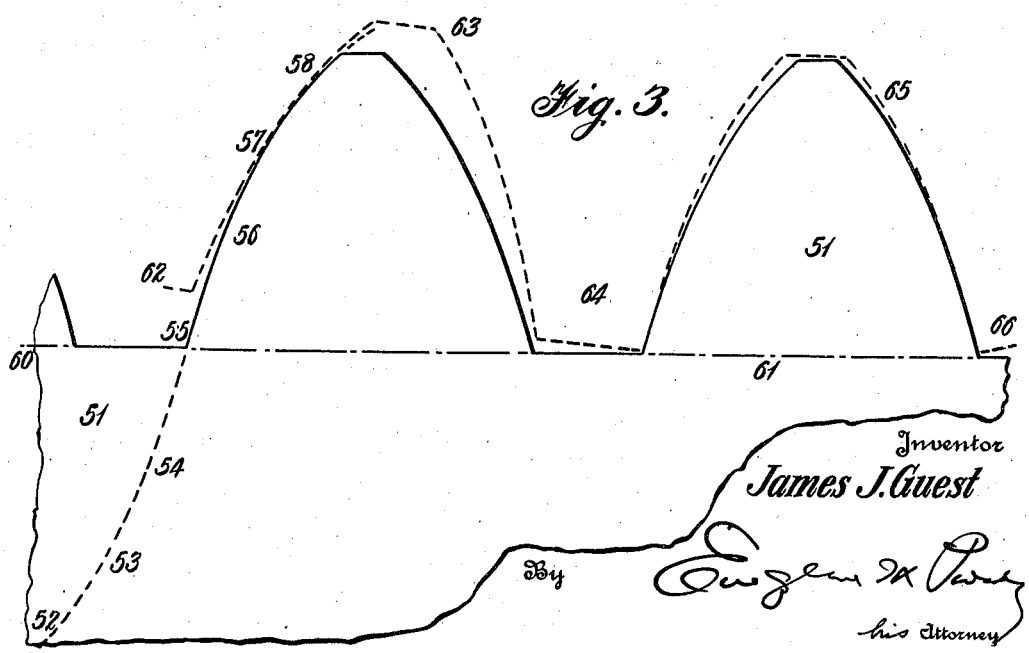
Inventor
James J. Guest Patented Aug. 30, 1938

2,128,815

UNITED STATES PATENT OFFICE 2,128,815

GEARING

James John Guest, Knee Hill, Abbey Wood, England

Application January 16, 1936, Serial No. 59,461
In Great Britain January 18, 1935

10 Claims. (Cl. 74—462)

This invention relates to a system of gear tooth shapes and the means of producing them, and is concerned with increasing the load capacity and with improving the interaction and with decreasing the effect of errors.

Two systems of gear tooth shape are in use: the cycloidal and the involute. In the former the shape of the teeth are formed of epicycloids and hypocycloids, and in the latter the tooth shape is an involute curve.

According to this invention the shape of the teeth is generated in the following manner. The basis of the system is a rack, imaginary in theory, in which the working faces of the teeth are curves which have a point of inflexion at the pitch line and are symmetrical with respect to this point. Thus a harmonic (sine) curve, the point of inflexion being set at the pitch line of the rack and the tangent located at a suitable angle and sufficient of the curve used to give a desirable action, is a tooth shape of the rack according to this invention.

The invention will be more clearly understood from the following detailed description of several preferred embodiments thereof, reference being had to the annexed sheets of drawings in which:

Figure 1 is a diagrammatic illustration of a rack having gear teeth generated in accordance with the invention and adapted for complemental mating engagement;

Figure 2 is a diagrammatic illustration of a modified rack having gear teeth corresponding in curvature to the portion of the gear tooth of Fig. 1 extending below the pitch circle of that figure; and Figure 3 is a diagrammatic illustration of a modified rack having gear teeth adapted to mate with the teeth of Fig. 2 and corresponding in curvature to the portion of the gear tooth of Fig. 1 extending above the pitch circle of the latter figure.

To generate the shape of the teeth of a gear of any selected number of teeth, the pitch-line of the basic rack of the system is rolled upon the pitch circle of the gear, and the envelope of the rack tooth forms the tooth shape of that particular gear. With a rack such as is described any pair of gears so produced will mate correctly together.

Figure 1, which is diagrammatic only being drawn to display the features of the invention clearly, shows a rack 1, having a suitable tooth form 2345678, according to this invention, the point of inflexion being 5, and the addendum 5678 being symmetrical to the dedendum 5432, with the pitch line 10—5—11 passing through the point of inflexion 5. The tangent 12—5—13 at the pitch point 5 is arranged to be inclined to the pitch line at an angle suitable for the gearing, and at the point 5 the centre of curvature is at infinity in the direction of the normal 5—14. The normals to the tooth curve touch the evolute, which is shown by the broken curve and which is asymptotic to 5—14 in the centres of curvature. Thus 15, 16 and 17 are the centres of curvature at the points 6, 7 and 8.

If the tooth of the rack be arranged so that the centre of curvature at 8, near the tip of the tooth, is at 17 where the evolute of the tooth cuts the pitch line, the tooth of any gear shape generated by the rack will have the closest possible contact with the rack tooth at this point. For the purposes of this invention as a point moves along the tooth outline from the pitch point 5, the corresponding centre of curvature moves along the evolute inwards towards the tooth, and should reach a point near the pitch line such as 15, the tooth outline stopping at the point 6 in this case, but to obtain the closest contact between the teeth of the various gears of the system the centre of curvature should reach a point close to the pitch line as is 16 or reach the pitch line as at the point 17, which is the centre of curvature of the tooth shape at the point 8, or go beyond the pitch line for the sake of improving the tip action. In actual generating tools provision for producing clearances is to be provided for.

The curve between 5 and 8 is selected so that the centre of curvature moves along a path in such a manner as to secure the closest contact between the teeth of the various gears of the system while avoiding detrimental features in the tooth curves.

The general proportions are arranged to secure the best results and so differ in various cases. Thus the angle which the tangent 12—5—13 makes with the pitch line 10—5—11 is adjusted to be larger if it is required that two teeth be always in contact than if one only is necessary, and is made smaller if gears of fewer teeth without under-cut are required.

A suitable curve for the rack shape can be produced by the locus of the central point 18, of the central link, 19, of a four-bar mechanism, in which the links, 20 and 21, adjacent to the central link are equal, and which links, 20 and 21, are pivoted at 22 and 23 to the fourth link—the fixed frame—which carries the surface upon which the point 18 traces out the curve, a portion of which 2345678 gives a satisfactory tooth shape according to this invention.

While approximately the same shape can be expressed by an equation in a form suitable for calculation and used for the tooth shape, by the simplicity of the four bar mechanism practical work can be carried out with ease and great accuracy.

The tooth of a gear generated by the rack is shown in Figure 1 by broken lines, 24, 25, 26, 27, in mesh with the rack.

For convenience any projection of these tooth forms can be used for the purposes of this invention, either for the working tooth shape or for the tools used. Thus clearances can be secured easily.

This invention can be applied in any manner in which the involute and cycloidal systems are now applied. Thus the two working profiles of the rack teeth, corresponding to action in one direction or the reverse, need not be the same, and gears can be made in which the action takes place wholly or partially after the pitch point, one of the gears having teeth with points or addenda only and the mating gear having teeth with roots or dedenda only, as is usual in clockwork. In the latter case, taking for simplicity in description, the contact to begin at the pitch point and to exist on one side of it only, the teeth consisting of points or of roots only, they can be generated as follows. The teeth of the first gear will be generated by a rack having as its tooth shape the root only 5432 of the rack of Figure 1, the spacing being suitably adjusted as is shown in Figure 2, in which 31 is the rack and the points 32, 33, 34, 35, correspond to the points 2, 3, 4, 5, in Figure 1, and the pitch line is 40—35—41. The teeth of the mating gear, being roots or dedenda only, will be generated by a rack having as tooth shape the point of the tooth 5678 of the rack of Fig. 1, the spacing being suitably adjusted as shown in Figure 3, in which 51 is the rack, and the points 55, 56, 57 and 58, correspond to the points 5, 6, 7, and 8, of the tooth shape in Figure 1, and the pitch line is 60—55—61. The continuation of the curve of Fig. 1, is shown at 35, 36, 37, 38 in Fig. 2, and at 55, 54, 53, 52, in Fig. 3, the inclination of the tangent at the pitch line being the same as in Fig. 1. Any gear generated by the first rack will have its teeth of the same shape as the teeth of the gear generated by the rack of Figure 1, the gears having the same pitch diameter, and will therefore mate correctly with any gear generated by the second rack, as this will have its roots of the same shape as those of the gear of the same diameter generated by the rack of Figure 1. Thus any gear of the first set will mate correctly with any one of the second set, although gears of the same set will not mate together. Examples of the teeth of gears generated by the racks 31 and 51 are shown by the broken line curves 42, 43, 44, 45, and 46 in Figure 2, and 62, 63, 64, 65, and 66 in Figure 3. Such gears mate together. The racks shown in these figures are the geometrical racks, in practice the tools are arranged to give clearances.

Actual gearing according to this system may be produced by any of the gear-cutting machines now in use, suitable tools being provided. In a gear-cutting machine of the planer type an actual rack tool is used or a single tooth tool. A disc tool corresponding to a gear of the system would be used in a rotating generating machine, a hob in a hobbing machine and formed cutters with relief in machine of the milling machine type and so on. For the system in which contact lies on one side of the pitch point only, a double sets of tools are required. Thus the whole range of gearing can be produced. For grinding either a generating process in which the wheel is trued to the shape of a rack tooth is used or a forming process in which the wheel is trued to the shape of the tooth of the particular gear being ground is employed.

Gearing of the cycloidal system can be produced by rack generation the rack tooth being a pair of cycloids. At the pitch line of this system the teeth have points of infinite curvature both in the addendum and dedendum, with the result that the stress is very high and that the centre distance of the gearing needs to be very precise. In the system of this invention there is on the contrary a point of inflexion at the pitch line so that the curvature there of the gear teeth of the system is not excessive and no unduly high stresses are incurred.

Gearing of the involute type has straight sided racks leading to two troubles. Firstly the curvature of the mating tooth increases rapidly below the pitch line becoming infinite at the base circle causing high stresses near that point, and secondly, when gears of low numbers of teeth are required the system has to be departed from. The system of this invention is not limited to the same extent and while any pair of gears of the involute system have teeth convex throughout leading to higher stresses, the teeth of this system mate as far as is possible convex to concave resulting in low surface stress and in better lubricant action.

In cutting helical gearing on this system the same tooth shapes may be used for the cutters, or a projection, or any form according to this system.

While the harmonic curve previously referred to can be easily used, the curve generated by the mechanism or one otherwise constructed gives preferable results as a better tooth shape can be secured throughout the gears of the whole range.

Having now particularly described and ascertained the nature of my said invention, and in what manner the same is to be performed, I declare that what I claim is:—

1. For a gear tooth system, a basic rack the profiles of which are formed of portions of curves having a point of inflexion at the pitch point of the rack and being symmetrical about said point of inflexion, the curvature progressively increasing from the pitch point towards the root and towards the tip of the tooth.

2. A gear generated from a basic rack, the profile of a rack tooth being formed of a portion of a sine curve and having a point of inflexion at the pitch point of the rack.

3. A gear generated from a basic rack, the profile of a rack tooth being formed of a part of a curve generated by the locus of the midpoint of a straight line of fixed length moving with its ends on two circles of equal radius.

4. In combination, a pair of mating gears the interengaging teeth of which are each generated from a basic rack, the profile of a rack tooth being formed of a part of a curve generated by the locus of the midpoint of a straight line of fixed length moving with its ends on two circles of equal radius.

5. A gear generated from a basic rack, the profile of a rack tooth being formed of a part of a curve generated by the locus of the mid-point of a straight line of fixed length moving with its ends on two circles of equal radius and having a point of inflexion at the pitch line of the rack.

6. For a gear tooth system, a basic rack the profiles of the rack teeth being formed of portions of curves having a point of inflexion at the pitch point of the rack and being symmetrical about said point of inflexion, the curvature progressively increasing from the pitch point towards the root and towards the tip of the tooth, and being such that the centre of curvature of the curve at a point near the tip of the tooth lie near to the pitch line of the rack.

7. A gear generated from a basic rack, the profile of a rack tooth being formed of a portion of a curve having a point of inflexion at the pitch point of the rack and being symmetrical with respect to said point of inflexion, and in which the curvature progressively increases from the pitch point towards the root and towards the tip of the tooth.

8. A gear generated from a basic rack, the profile of a rack tooth being formed of a portion of a curve having a point of inflexion at the pitch point of the rack and being symmetrical with respect to said point of inflexion, and in which the curvature progressively increases from the pitch point towards the root and towards the tip of the tooth and in which the centre of curvature of the curve at a point near the tip of the tooth lies near to the pitch line of the rack, with correspondence on the root side of the tooth shape.

9. A toothed gear generated from a basic rack, the teeth of said rack being formed in transverse cross-section of portions of curves having a point of inflexion at the pitch point of the rack and being symmetrical about said point of inflexion, the curvature progressively increasing from the pitch point toward the tip of the tooth.

10. A pair of mating gears in which the teeth are adapted to operate substantially entirely upon one side of the pitch point and in which the shape of the teeth is generated from a basic rack the teeth of which rack are constituted of a curve having an infinite radius of curvature at the pitch point and in which the curvature progressively increases from the pitch point in a direction away therefrom and in which the centre of curvature of the tooth curve near the extremity of its working part lies closely adjacent to the rack pitch line.

JAMES JOHN GUEST.